2,975,196
CHLORINATION OF NAPHTHOQUINONE

Bengt Tore Lennart Sjostrand, Goteborg, Sweden, assignor to Svenska Oljeslageri Aktiebolaget, Goteborg, Sweden No Drawing. Filed Sept. 3, 1958, Ser. No. 758,669

Claims priority, application Sweden Sept. 11, 1957

10 Claims. (Cl. 260—396)

According to the copending application Serial No. 691,539, 1,4-naphthoquinone is chlorinated to 2,3-dichloro-1,4-naphthoquinone with chlorine and a catalyst, e.g. iron powder, waterfree $FeCl_3$ or similar substances. The reaction seems to involve two stages. In the first stage 1,4-naphthoquinone is chlorinated to naphthoquinone-dichloride and in the second stage the naphthoquinone-dichloride is dehydrochlorinated to 2-chloro-1,4-naphthoquinone and this last mentioned substance is simultaneously chlorinated to 2,3-dichloro-1,4-naphthoquinone.

It is important that the reaction in the first stage is carried out in absence of an active catalyst, since such a catalyst would give rise to undesirable side reactions. According to said patent application this condition is obtained in a process comprising a number of cycles in which the reaction medium is recirculated from one cycle to the following by the inactivation of the catalyst which may remain active in the mother liquor, before this is reused in the subsequent cycle. Preferably $FeCl_3$ for example is converted into the hydrate form $FeCl_3.6H_2O$ and thus made devoid of any catalytic activity under the conditions at which the reaction is carried out in the first stage of each cycle. Before the second reaction stage of each cycle is started a suitable catalyst, however, must be added to the reaction system, e.g. anhydrous $FeCl_3$.

It has now surprisingly turned out, and the present invention is based upon this discovery, that for chlorination commonly used metal-halides or metals and salts forming halides during the reaction may act as a catalyst in the second stage also in their hydrous form if the reaction in this stage is carried out at a certain temperature defined herein below using a nonaqueous reaction medium. Preferably $FeCl_3.6H_2O$ is used. This is very surprising and cannot be due to dehydration. $FeCl_3.6H_2O$ for example has a dehydration temperature, which is much higher than any of the temperatures which are used in the present case.

Using as a catalyst for the chlorination of naphthoquinone $FeCl_3.6H_2O$ dispersed in nitrobenzene as a reaction medium, it was observed that at a reaction temperature of 50° C. in the second stage substantially no reaction takes place and the major part of the chlorine gas added at this temperature passes unaffected through the reaction mixture. At 60° C. an appreciable reaction takes place, the rate of which, however, is too low and up to 50% of the chlorine passes unaffected through the reaction mixture if added at the space velocity commonly used in practice. At a temperature of 70° C. the reaction in the second stage proceeds readily and the major part of the added chlorine gas is reacted.

Instead of using $FeCl_3.6H_2O$ it is possible to use the anhydrous $FeCl_3$ with an addition of an equivalent amount of water to form $FeCl_3.6H_2O$. Also minor amounts of water can be used preferably, however, at least half this amount.

In a process comprising a number of cycles in which the reaction medium is recirculated from one cycle to the following it has turned out to be advantageous in many regards to use the hydrous form of the catalyst under such conditions that the catalyst is rendered active in the second stage of each cycle only. In this way the risk of formation of by-products in the first and second reaction stages is less and the mother liquor remains purer and the 2,3-dichloro-1,4-naphthoquinone formed is received in a purer state. Further it is not necessary to remove any inactivated catalyst, which according to the method of the copending application mentioned above gradually accumulate in the reaction medium. According to the present invention no such accumulation of inactivated catalyst takes place. As a result a further advantage is achieved in that the end product will not be contaminated by inactivated catalyst in any significant degree. This contamination accrues from the fact that mother liquor in a relatively great amount may be entrapped in the filter cake when the end product is filtered off.

Nitrobenzene has proved to be especially advantageous as a reaction medium at the reaction. Also substituted nitrobenzenes as nitrotoluene can be used.

In order that the invention may be more fully understood the following examples are given by way of illustration only:

Example 1

A reaction vessel equipped with stirrer, heater and cooling means was charged with 1600 grams nitrobenzene in which 25 grams $FeCl_3.6H_2O$ was dissolved. In this solution 400 grams naphthoquinone was slurried. Chlorine gas was then added at 20–25° C. at a rate of 50 grams per hour. The reaction was maintained at said temperature 4 hours after which the first stage was terminated. The temperature was increased to 70° C. while maintaining said rate of the chlorine addition and the chlorine addition was continued at a rate of 50 grams per hour for further 3.5 to 4 hours. After this period of time the temperature was rapidly increased to 85° C., the chlorine addition at the same time was decreased to 25 grams per hour. After the course of 1 hour the reaction was discontinued and the content of the reaction vessel was cooled to ambient temperature. At this cooling the 2,3-dichloro-1,4-naphthoquinone formed precipitated and was filtered off from the mother liquor. Yield 87.5% of theoretical; M.P. 195° C.

Example 2

To the mother liquor thus obtained (about 1500 grams) 100 grams nitrobenzene and 1.5 grams $FeCl_36H_2O$ was added in order to make up for lost reaction medium and catalyst and the reaction was repeated in the way described above using the reaction medium thus compensated. In this way 20 cycles were carried out.

In the first cycle the yield was 86% of the theoretic value. The melting point of the product was 195° C. The average yield in the subsequent 19 cycles was 95% and the average melting point of the product was 195.5° C. The mother liquor remained in a good state during all the reaction cycles and was of a better quality than in the case of using anhydrous $FeCl_3$ as a catalyst in the second reaction stage followed by the inactivation of the catalyst before the repetition of the first stage.

Example 3

(a) In accordance with Example 1 400 grams naphthoquinone was dispersed in 1600 grams nitrobenzene to which 5 grams iron powder had been added. Chlorine gas was added at 25–30° C. at a rate of 100 grams per hour. After 2 hours the Reaction I was terminated. The temperature was then increased to 55° C. while maintaining the chlorine addition at a rate of 50 grams per hour. After 4 hours (when the main part of the Reaction II was ended) the temperature was increased to 85° C., the chlorine rate decreased to 25 grams per hour and the reaction kept under these conditions for an additional time of one hour. After cooling the chloronaphthoquinone thus formed, was filtered off and washed with a minor part of nitrobenzene.

(b) To the mother liquor (1600 grams) 10 grams of water was added in order to obtain FeCl$_3$.6H$_2$O. 400 grams naphthoquinone was added and the first reaction was run as described above. After this reaction step the temperature was raised and the second reaction was run as described above with the exception that the temperature was raised to 70° C. instead of 55° C. (At 55° C. the reaction rate was very slow.) The mother liquor thus obtained, was used in repeated cycles in accordance with Example 3b.

Yields: cycle a: 87% of theoretical; cycle b: 94% of theoretical.

The average yield of the subsequent 20 cycles was 94.8%. The average melting point was 195° C.

Example 4

400 grams naphthoquinone was dispersed in 1600 grams nitrobenzene to which 5 grams iron powder and 10 grams water was added in order to convert the formed FeCl$_3$ into FeCl$_3$.6H$_2$O. The reaction was carried out as in Example 1. The same yield and melting point as in Example 1 was obtained.

What I claim is:

1. A process according to claim 5, in which the reaction medium is selected from the group consisting of nitrobenzene and nitrotoluene.

2. A process according to claim 5, in which the catalyst is FeCl$_3$.6H$_2$O.

3. A process according to claim 5, in which the reaction medium is nitrobenzene and the catalyst is FeCl$_3$.6H$_2$O.

4. A process according to claim 5, in which the temperature in the second stage of each cycle is above 65° C.

5. In a catalyzed chlorination process for the production of 2,3-dichloro-1,4-naphthoquinone from 1,4-napthoquinone in two stages, the first stage comprising passing chlorine through a reaction medium containing the 1,4-naphthoquinone until the 1,4-naphthoquinone is substantially converted into naphthoquinone dichloride, the second stage comprising treating the naphthoquinone dichloride while contained in the reaction medium for dehydrochlorination to monochloro-naphthoquinone and further chlorination to 2,3-dichloro-1,4-naphthoquinone, the improvement of using as a catalyst hydrous FeCl$_3$ with an amount of water not less than that corresponding to 3 moles of water per mole of FeCl$_3$ present in the reaction medium, carrying out the first stage at a temperature below 45° C. and the second stage at a temperature above 60° C.

6. In a catalyzed chlorination process for the production of 2,3-dichloro-1,4-naphthoquinone from 1,4-naphthoquinone which comprises passing chlorine through a reaction medium containing the 1,4-naphthoquinone while maintaining the temperature of the reaction medium below 45° C. for a time sufficient for a first chlorination wherein there occurs substantially complete chlorination of all the naphthoquinone to naphthoquinone-dichloride, thereafter performing a second chlorination where there occurs conversion of naphthoquinone-dichloride to 2,3-dichloro-1,4-naphthoquinone by steps comprising passing chlorine through the naphthoquinone-dichloride containing reaction mixture while providing catalytic conditions therein for said conversion, for a time and at a temperature sufficient for said second chlorination to occur, separating 2,3-dichloro-1,4-naphthoquinone from the reaction medium, and thereafter reusing the reaction medium for production of naphthoquinone-dichloride from naphthoquinone as aforesaid, the improvement of employing as catalyst hydrous FeCl$_3$ with an amount of water not less than that corresponding to 3 moles of water per mole of FeCl$_3$ present in the reaction medium and maintaining the catalyst-containing reaction medium at a temperature of at least 60° C. during the said second chlorination stage for the conversion to 2,3-dichloro-1,4-naphthoquinone, separating 2,3-dichloro-1,4-naphthoquinone from the reaction mixture and catalyst and using the resulting mixture containing the catalyst for production of naphthoquinone-dichloride from naphthoquinone in said first chlorination as aforesaid whereby reaction medium containing FeCl$_3$ catalyst is used for the first and second chlorinations without interfering with the first chlorination and the reaction medium containing the catalyst is successively reused in the process.

7. A process according to claim 6, in which the reaction medium is selected from the group consisting of nitrobenzene and nitrotoluene.

8. A process according to claim 6, in which the catalyst is FeCl$_3$.6H$_2$O.

9. A process according to claim 6, in which the reaction medium is nitrobenzene and the catalyst is FeCl$_3$.6H$_2$O.

10. A process according to claim 6, in which the temperature in the second stage of each cycle is above 65° C.

References Cited in the file of this patent

UNITED STATES PATENTS

| 1,969,686 | Britton | Aug. 7, 1934 |
| 2,722,537 | Fox | Nov. 1, 1955 |
| 2,750,427 | Gaertner | June 12, 1956 |
| 2,835,700 | Boyle et al. | May 20, 1958 |

FOREIGN PATENTS

| 589,501 | Great Britain | June 23, 1947 |
| 646,638 | Germany | July 12, 1937 |

OTHER REFERENCES

Brass: Berichte Deutsche Chem. Gesell., vol 55, page 2554 (1922).